United States Patent [19]

Matsumoto et al.

[11] Patent Number: 5,105,291
[45] Date of Patent: Apr. 14, 1992

[54] LIQUID CRYSTAL DISPLAY CELL WITH ELECTRODES OF SUBSTANTIALLY AMORPHOUS METAL OXIDE HAVING LOW RESISTIVITY

[75] Inventors: Fuyuhiko Matsumoto; Masato Tani, both of Kawasaki; Takamichi Enomoto, Kanagawa, all of Japan

[73] Assignee: Ricoh Company, Ltd., Tokyo, Japan

[21] Appl. No.: 607,032

[22] Filed: Oct. 31, 1990

[30] Foreign Application Priority Data

Nov. 20, 1989 [JP] Japan ................................ 1-301057

[51] Int. Cl.$^5$ .................... G02F 1/133; H01B 1/00; C23C 14/00; B05D 5/12
[52] U.S. Cl. .................... 359/87; 174/257; 204/192.29; 427/126.3
[58] Field of Search ................ 350/336; 174/257; 204/192.29; 427/126.3; 359/87 US

[56] References Cited

U.S. PATENT DOCUMENTS

| | | | |
|---|---|---|---|
| 4,121,238 | 10/1987 | Bachmann et al. | 357/17 |
| 4,792,210 | 12/1988 | Maurice | 350/334 |
| 4,835,061 | 5/1989 | Ohta et al. | 174/257 |
| 5,013,416 | 5/1991 | Murayama et al. | 204/192.29 |

OTHER PUBLICATIONS

Vossen, J. L., "Control of Film Properties by rf-Sputter Techniques", Journal of Vacuum Science and Technology, vol. 8, No. 5, pp. 512-529, 1971.

Fraser et al., "High Conductivity, Transparent Films of Sputtered $In_{2-x}Sn_xO_{3-y}$", J. Electrochemical Soc.: Solid-State Science and Technology, vol. 119, No. 10, pp. 1368-1374, 10/1972.

Smith et al., "Effects of Heat-Treatment on Indium-Tin Oxide Films", J. Electrochemical Soc: Solid-State Science and Technology, vol. 128, No. 11, pp. 2388-2394, 11/81.

Ridge et al., "Composition Control in Conducting Oxide Thin Films", Thin Solid Films, 96, pp. 121-127, 10/82.

*Primary Examiner*—Stanley D. Miller
*Assistant Examiner*—Ron Trice
*Attorney, Agent, or Firm*—Oblon, Spivak, McClelland, Maier & Neustadt

[57] ABSTRACT

A liquid crystal display cell comprising a pair of flexible polymer film substrates having a transparent electrode disposed on the surface thereof and a liquid crystal material sandwiched therebetween. The transparent electrode is a metal oxide film which has a surface resistivity of not greater than 100 ohm per square, a bending property of not greater than 2.0, a curling degree, H, of $0<H<5$ mm and a transmittance to light of 550 nm of not less than 75%. Further, this metal oxide is substantially amorphous, and is formed by a DC sputtering method.

11 Claims, 3 Drawing Sheets

LIQUID CRYSTAL DISPLAY CELL WITH ELECTRODES OF SUBSTANTIALLY AMORPHOUS METAL OXIDE HAVING LOW RESISTIVITY

BACKGROUND OF THE INVENTION

The present invention relates to a liquid crystal display cell and, more particularly, it relates to a liquid crystal display cell in which a liquid crystal material is sandwiched between a pair of flexible polymer film substrates having a specific transparent electrode disposed on the surface thereof.

In liquid crystal display cells, those having transparent conductive films (transparent electrodes) formed on the surface of a substrate made of a high melting material such as glass or quartz, have often been used generally. In the case of using such a high melting substrate, since the transparent electrode film can be formed at a relatively high temperature (higher than 150° C.), the thus formed transparent conductive film is highly crystalline and has great toughness. In addition, upon manufacturing a liquid crystal cell, since the substrate is rigid, the substrate is not bent during the manufacturing steps and as a result, no cracks are formed in the transparent electrode.

Along with a recent trend in the liquid crystal display cell of reducing the weight and the thickness, it has been attempted to replace the high melting substrate such as glass with a synthetic resin substrate (in particular, a flexible polymer film substrate). For instance, it has been proposed a liquid crystal display cell produced by using a synthetic resin film as a substrate and forming a transparent conductive film made of a metal oxide such as ITO, indium oxide, tin oxide or antimony oxide on the flexible synthetic resin substrate (refer, for example, to Japanese Patent Publication (KOKOKU) No. 62-3929, Japanese Patent Application Laid-Open (KOKAI) Nos. 62-187324 and 63-18327).

In the liquid crystal display cell using the flexible polymer film as the substrate, however, since the substrate is flexible, the resistivity is increased due to the occurrence of cracks in the transparent electrode during the manufacturing steps of the liquid crystal display cell, or cracks arise in the transparent electrode by pressurizing or heating upon connection with a driving circuit, thereby bringing about an undesirable phenomenon of display defect at present. The phenomenon becomes more conspicuous as the resistivity of the transparent electrode is lower and the film thickness of the transparent electrode is greater, and as a result, the yield of the liquid crystal display reduces.

Recently, the liquid crystal display using the flexible film substrate has been required to provide more fine and accurate display, high display-capacity and large display-area, and accordingly, the suppression of the occurrence of cracks in the transparent electrode is demanded.

As a result of an earnest study for providing a liquid crystal display of more fine and accurate display, high display-capacity and large display-area by using a flexible polymer film substrate and with no occurrence of cracks in the transparent electrode formed on the substrate, it has been found that a metal-oxide film formed on a polymer film substrate by means of a specified sputtering method, vacuum vapor deposition method or ion plating method based on the following knowledges, which the metal-oxide film has a surface resistivity of not greater than 100 ohm/□ and is substantially amorphous, is able to dissolve the foregoing technical subjects:

(1) it is required for the liquid crystal display having a high display-capacity to reduce the surface resistance for the resistivity of the transparent conductive film to not greater than 100 ohm/□, but the formation of a liquid crystal display cell becomes extremely difficult in view of the occurrence of cracks of the transparent conductive film and the occurrence of curling in the substrate in the case of reducing the surface resistivity to not greater than 100 ohm/□;

(2) as a result of X-ray analysis for ITO films often used generally as the transparent electrode, the crystallization occurs even in the ITO film having the surface resistivity of not greater than 100 ohm/□ on the flexible polymer film substrate like that in the ITO film on the glass substrate (on the contrary, the ITO film having the surface resistivity of 200 to 300 ohm/□ on the flexible polymer film substrate is substantially amorphous); and (3) in view of the relationship between the crystallinity in the ITO film and the bending property (Note (3) described later), curling property (Note (4) described later) and the etching property (Note (5) described later) of the ITO film, these three properties are all worsened as the crystallization is higher. Based on the finding, the present invention has been attained.

SUMMARY OF THE INVENTION

In an aspect of the present invention, there is provided a liquid crystal display cell comprising a pair of flexible polymer film substrates having a transparent electrode on the surface thereof and a liquid crystal material sandwiched therebetween, the transparent substrate being a metal-oxide film which has a surface resistivity of not greater than 100 ohm/□, is substantially amorphous and has a high transmittance.

DESCRIPTION OF THE ACCOMPANYING DRAWINGS

DETAILED DESCRIPTION OF THE INVENTION

A metal-oxide film as a transparent electrode is formed on a flexible polymer film substrate according to the present invention by using a specific film-forming method, for example, specified sputtering method, specified vacuum vapor deposition method or specified ion plating method, has a surface resistivity of not greater than 100 ohm/□, preferably, from 10 to 80 ohm/□; has a substantially amorphous structure (having not less than 50% of an amorphous portion), preferably a structure having not less than 70% of the amorphous portion; and is transparent in a visible region, specifically, with the transmittance to visible rays (at 550 nm) of not less than 75%, preferably not less than 80%. It is supposed that the worsening of the bending resistance, etc. of an ITO film observed by reducing the resistivity of the ITO film is attributable to the progress of crystallization in ITO. In particular, for reducing the surface resistivity to about 100 ohm/□ or lower, it is required to increase the thickness of the ITO film and, since crystallization proceeds along with the increase of the thickness, the tendency of worsening the bending resistance, etc. becomes remarkable.

Then, when the bending resistance, etc. of the ITO film having the surface resistivity of not greater than 100 ohm/□ and a substantially amorphous structure as a transparent electrode formed on the flexible polymer film substrate in the liquid crystal display cell according to the present invention is examined, it has been confirmed that a satisfactory bending resistance equal with that of the known ITO films having a resistivity about from 200 to 300 ohm/□, which has a substantially amorphous structure. (refer to FIG. 1). In the present invention, "substantially amorphous structure" means that there is not less than 50% of the amorphous portion in the entire film (less than 50% of crystallinity).

There are specific conditions for forming an ITO film having the surface resistivity of not greater than 100 ohm/□ and being substantially amorphous on the flexible polymer film.

As the film-forming method, specified sputtering method, vacuum vapor deposition method or ion plating method can be employed and one example of the film-forming conditions by means of a DC sputtering process is as shown below.

Mixing ratio between $O_2$ as a reaction gas and Ar as a carrier gas:
  $O_2$/Ar partial pressure ratio: 5-20/1,000,
  preferably 5-10/1,000
Vacuum degree:
  $10^{-3}$-$10^{-4}$ Torr
Film-forming rate:
  5-13 Å/sec, preferably 8-10 Å/sec
Sputtering voltage:
  200-500 V
Substrate temperature:
  not more than 120° C., preferably 40°-100° C.
ITO film thickness:
  500-2000 Å, preferably 1000-1500 Å.
(ITO containing 5 wt % of Sn was used as the target).

Figure 5:
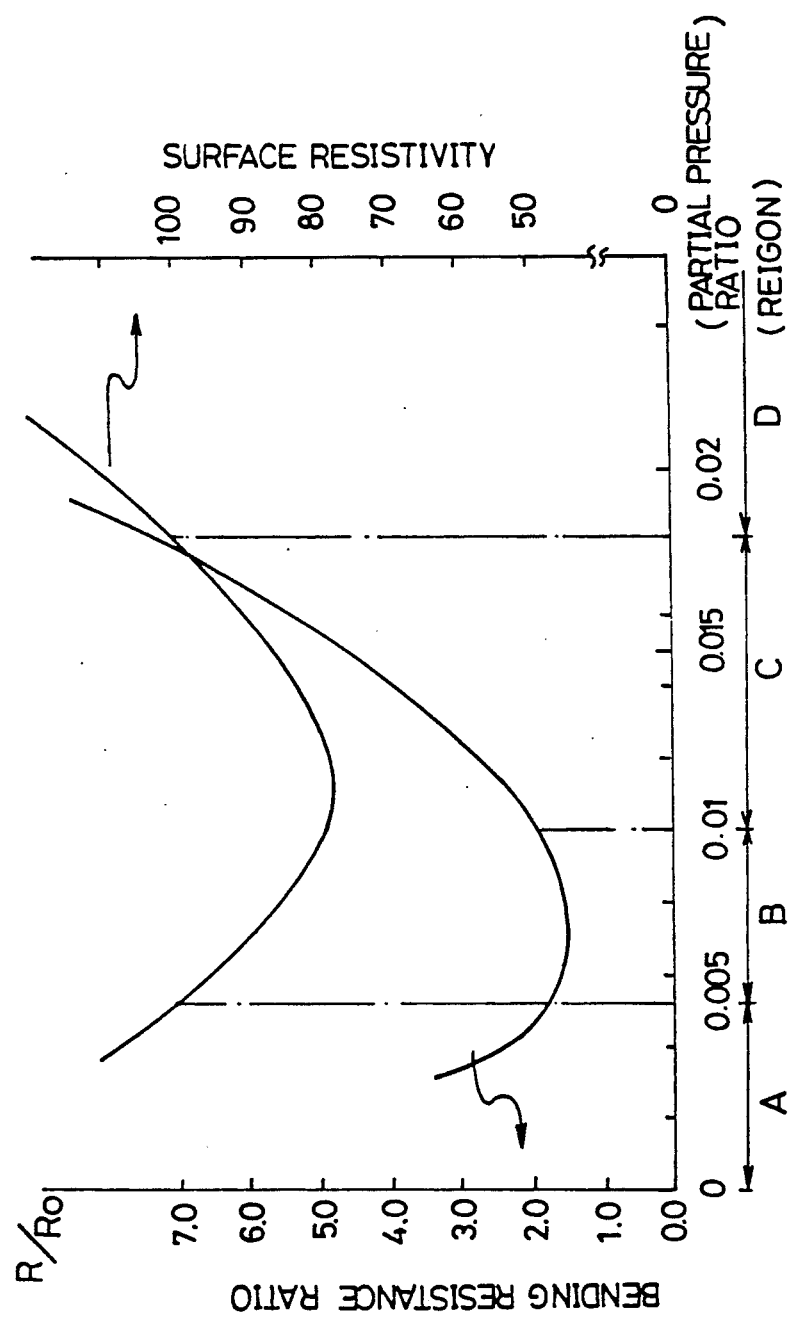
FIG. 5 is a graph representing the values of the physical property of ITO films which are formed while varying the film-forming conditions.

FIG. 5 is a diagram showing the result of measurements that represent the surface resistivity and bending resistance ratio of ITO films obtained by applying ITO film-forming while varying the ratio of the carrier gas and the reaction gas in the gases introduced in the forming conditions of the present invention. If the results are divided into parts above and below 100 ohm/□ for the surface resistivity, and into parts above and below 2.0 for the bending resistance ratio, regions A, B, C and D are obtained. The results are shown in Table 1. Preferred ITO films are those having the film surface resistivity: not less than 100 ohm/□, the crystallographic nature: amorphous, the bending property (bending resistance ratio): not greater than 2.0, less curling degree and easy etching property. Such ITO film is one manufactured in the region B.

TABLE

| | Region | | | |
|---|---|---|---|---|
| | Region A | Region B | Region C | Region D |
| $O_2$/Ar partial pressure ratio | <0.00 | 0.005–0.010 | 0.010–0.018 | >0.018 |

TABLE-continued

| | | | | |
|---|---|---|---|---|
| Surface resistivity of ITO film crystalline property | not less than 100 ohm/□ amorphous (amorphous portion: >50%) | not greater than 100 ohm/□ amorphous (amorphous portion: >50%) | not greater than 100 ohm/□ crystalline (amorphous portion: <50%) | not less than 100 ohm/□ crystalline (amorphous portion: <50%) |
| Bending property | above 2.0 and below 2.0 | below 2.0 | above 2.0 | above 2.0 |
| Curling degree | small | small | great | great |
| Etching property | easy | easy | difficult | difficult |

(Note)
(1) Surface resistivity of ITO film:
Measured by 4-probe method using ROLESTA AP (manufactured by Mitsubishi Yuka Co.)
The film surface resistivity is necessary to be not greater than 100 ohm/□.
(2) Cyrstalline property:
Measured by a relaive method.
It is necessary to be substantially amorphous, that is, more than 50% of the amorphous portion is present (crystallinity is less than 50%).
(Relative Method)
The diffraction data obtained from the standard specimens having known crystallinity are indicated while marking "max" to the data with greater crystallinity and "min" to the data with smaller crystallinity.
In the calculation for the crystallinity by the relative method, data within a range in which the measuring angles are in common with the two kind of standard data and the data obtained from the test specimens, are used and calculation is conducted by determining the correlation coefficient between them. The correlation coefficient is detemined by the following formula:
$C = \Sigma (I(\theta) - Imin(\theta))/\Sigma (Imax(\theta) - Imin(\theta))$
(wherein $I(\theta)$, $Imin(\theta)$ and $Imax(\theta)$ represent X-ray diffraction intensity from tested specimen, standard specimen with small degree of crystallinity and standard specimen of great degree of crystallinity, respectively,
and $\Sigma$ represents the sum of the three data within a range where the angles are in common with each other).
The crystallinity for the test specimen is calculated in accordance with the following formula by using the correlation coefficient C:
$Xcr = C(Xmax - Xmin) + Xmin$
(wherein X represents the degree of crystallinity for the corresponding specimen).
(3) Bending property:
An electrode made of ITO with 300 μm in width and 100 mm in length was formed by etching the transparent conductive film on a PET film and 180° extenal bending was applied for once by way of cylindrical post of 6 mmφ (bending with the ITO film being situated to the outerside) by using a Gardner bending tester, and durability was evaluated based on an inter-terminal resistivity ratio of the specimen before and after bending test and $R_0$ represents resistivity before bending test).
The bending property is preferably not greater than 2.0, more preferably not greater than 1.5.
(4) Curling degree:
A specimen of 100 mm² prepared by forming ITO on a PET film by means of DC sputtering was left on the flat surface of glass for 1 min in an atmosphere of 20° C. and 45% RH. Then, the degree of warp of the specimen was evaluated as the height (H) from the surface. It was defined as large for $|H| \geq 5$ mm and as small for $|H| < 5$ mm, and $0 < H < 5$ mm is preferred.
(5) Etching property:
A line pattern of about 300 μm width was etched at 30° C. by using an aqueous solution comprising 12N—HCl: an aqueous 36 wt % $FeCl_3$ solution: purified water = 1:1:2 (vol. ratio).
The etching property was defined as "easy" if the etching time was within 90 sec and as "difficult" if the time was more than 90 sec.

As the metal oxide for forming the transparent electrode in the present invention, there can be mentioned, for example, ITO, indium oxide, tin oxide, zinc oxide and antimony sulfide.

As the flexible polymer film substrate in the present invention, there can be mentioned, for example, polycarbonate film, polyarylate film, polyester film, polysulfone film, polyester sulfone film and polyethylene terephthalate film.

As the liquid crystal material in the present invention, there is no particular restrictions and those that can be served practically are usable.

The thickness of the metal oxide film forming the transparent electrode in the present invention is from 500 to 2000 Å, preferably 1000 to 1500 Å. The thickness of the flexible plastic film substrate is from 50 to 500 μm, preferably 75 to 200 μm.

Figure 1:
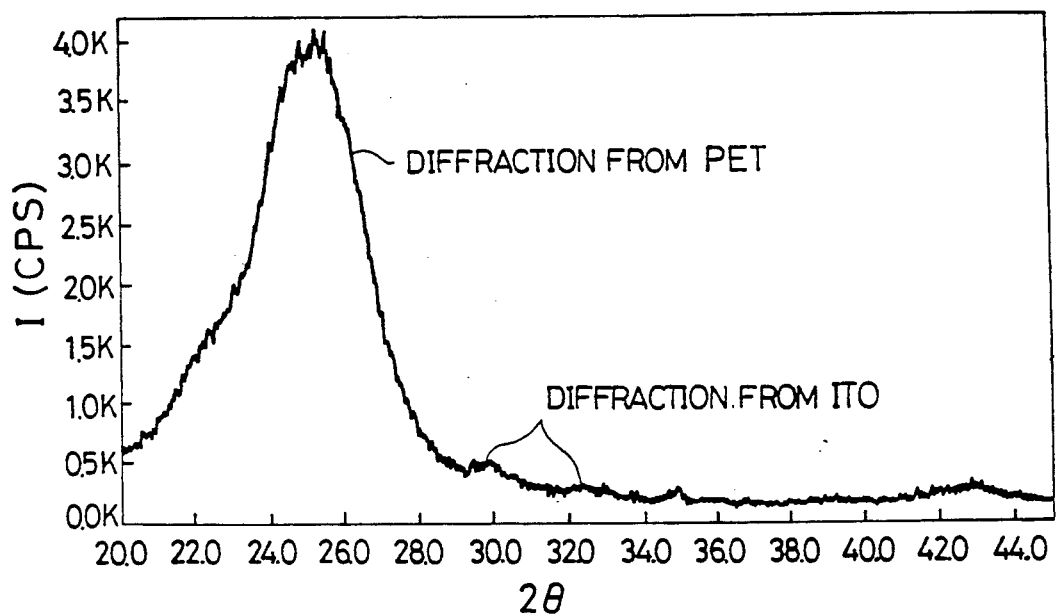
FIG. 1 is a graph representing the result of X-ray diffractiometry of an ITO film of a liquid crystal display cell according to the present invention.
Figure 2:
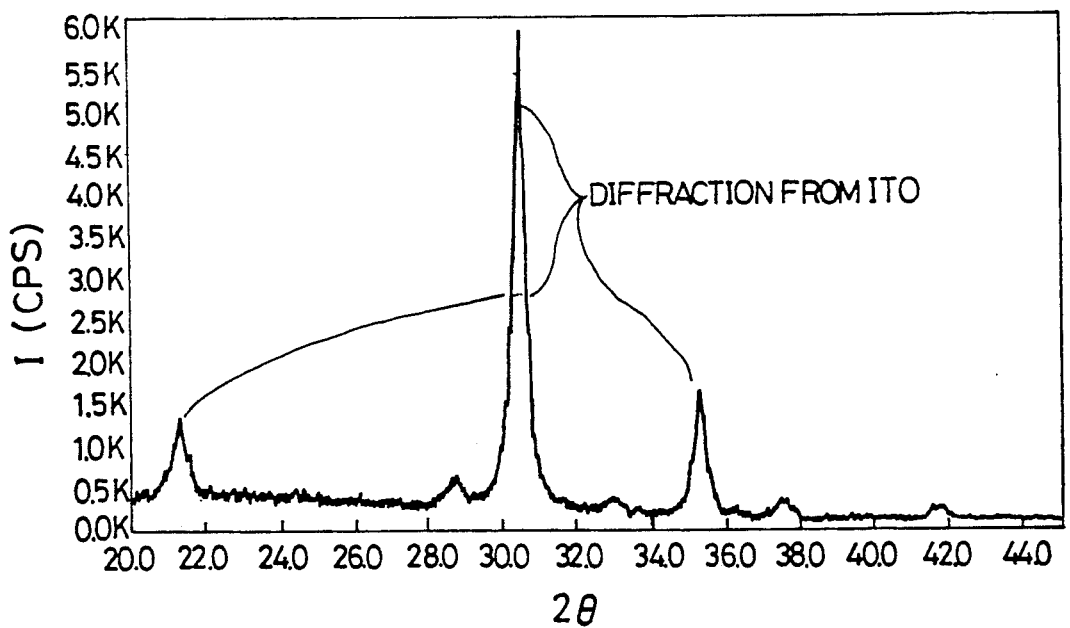
FIGS. 2, 3 and 4 are, respectively, graphs representing the result of X-ray diffractiometry of comparative ITO films.
Figure 3:
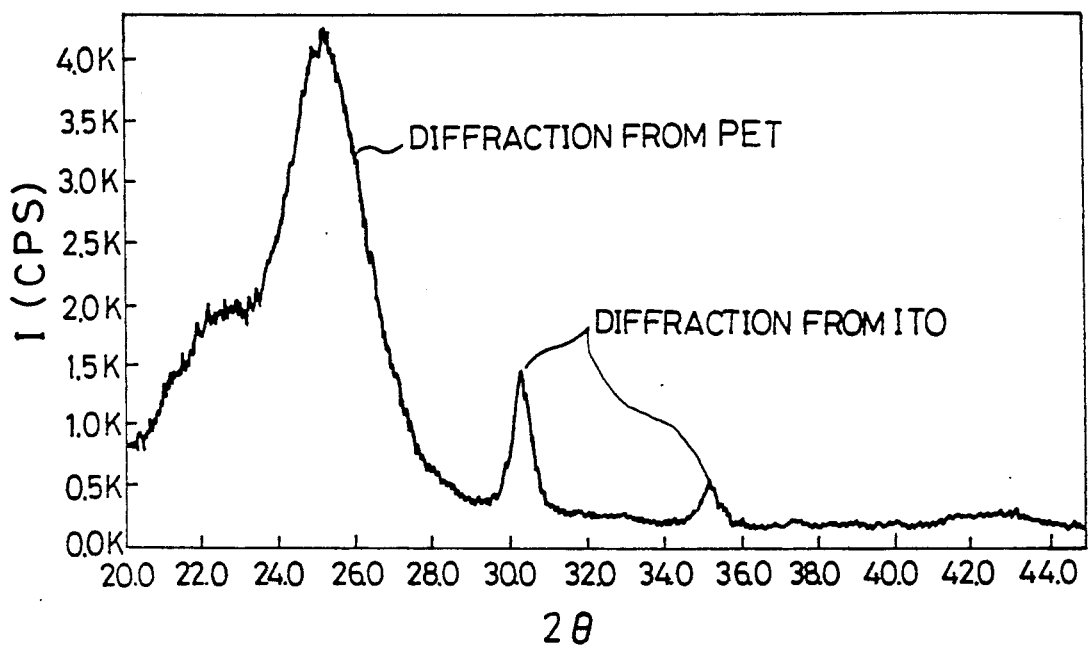
Figure 4:
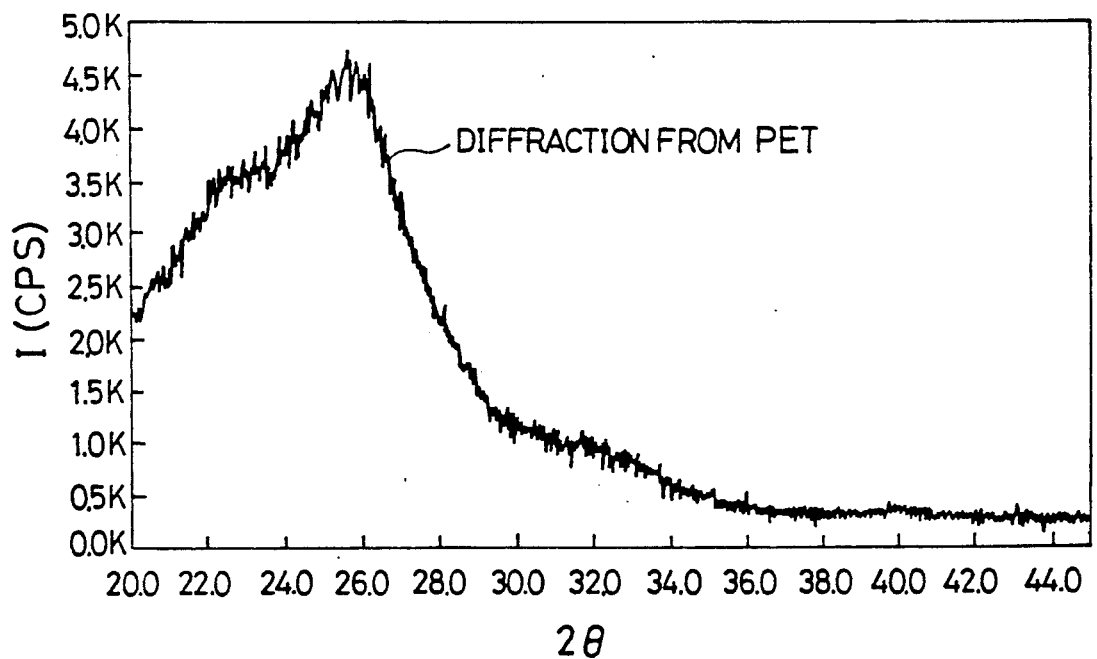

It can be apparent that the ITO film according to the present invention is substantially amorphous from the comparison of X-ray diffraction diagram for the ITO film as a transparent electrode on a flexible plastic film (PET) according to the present invention (FIG. 1); X-ray diffraction diagram for the crystallized ITO film on glass (FIG. 2); X-ray diffraction diagram for the ITO film in which crystallization occurs to such an extent of reducing the surface resistivity to not greater than 100 ohm/□ on a conventional flexible plastic film (PET) (FIG. 3); and X-ray diffraction diagram for the existent amorphous ITO film with the surface resistivity of from 200 to 300 ohm/□ on a flexible plastic film (PET) (FIG. 4).

The liquid crystal display cell according to the present invention has the following advantages.

(1) A transparent conductive film with low resistivity and having excellent bending resistance, curling and etching properties can be obtained on a flexible film.

(2) Since the curling property and the bending resistance are excellent in the step of manufacturing liquid crystal display cells using the flexible film, there are no troubles in the manufacturing steps and cells of a large area can be fabricated.

(3) With the improvement for the bending resistance, the connection with a driving circuit portion is facilitated and the display defect can be eliminated to improve the yield.

(4) Since the transparent conductive film at low resistivity can be obtained, it is possible to increase the display capacity and enlarge the surface area for display.

EXAMPLE

The present invention is explained in more detail in the following examples; however, it should be recognized that the scope of the present invention is not restricted to these examples.

EXAMPLE 1

A monoaxially stretched PET film of about 100 μm in thickness was used as a substrate and an ITO film was formed on the substrate by the following sputtering conditions to obtain a transparent conductive film having a film thickness of about 750 Å, surface resistivity of 75 ohm/□ and further, having the following properties:

| | |
|---|---|
| Bending property: | 1.6 |
| Degree of curling: | 2-3 mm |
| Etching property: | 50-70 sec |

A STN type liquid crystal display cell was manufactured by using the obtained ITO film and, when the cell was driven at 1/200 duty, excellent display free from defects was obtained. (Sputtering condition)

| | |
|---|---|
| (1) Mixing ratio between the reaction gas ($O_2$) and the carrier gas (Ar) ($O_2$/Ar partial pressure ratio): | 6/1000 |
| (2) Vacuum degree: | $1.5 \times 10^{-3}$ Torr |
| (3) Film-forming rate: | 8 Å/sec |
| (4) Sputtering voltage: | 390 V |
| (5) Substrate temperature: | 60° C. |
| (6) Target: | ITO containing 5 wt % of Sn |

What is claimed is:

1. A liquid crystal display cell comprising a pair of flexible polymer film substrates having a transparent electrode disposed on the surface thereof and a liquid crystal layer sandwiched therebetween, said transparent electrode being a metal oxide film which has an amorphous portion of not less than 50% in the entire metal oxide film, a surface resistivity of 10 to 80 ohm per square, a transmittance to light of 550 nm of not less than 75%, and a bending property of not greater than 2.0.

2. A liquid crystal display cell according to claim 1, wherein the transparent electrode has a curling degree, H, of $0<H<5$ mm and an etching time of not greater than 90 sec.

3. A liquid crystal display cell according to claim 1, wherein the transparent electrode is formed by a DC sputtering method.

4. A liquid crystal display cell according to claim 3, wherein the DC sputtering method is carried out under film-forming conditions of a mixing ratio (partial pressure ratio) between a reaction gas and a carrier gas of 5/1000–10/1000, a vacuum degree of $10^{-3}$–$10^{-4}$ Torr, a film-forming rate of 5–13 Å/sec, a sputtering voltage of 200–500 V and a substrate temperature of not higher than 120° C.

5. A liquid crystal display cell according to claim 1, wherein the thickness of the transparent electrode is from 500 to 2000 Å.

6. A liquid crystal display cell according to claim 1, wherein said metal oxide film is selected from the group consisting of ITO, indium oxide, tin oxide, zinc oxide or antimony oxide.

7. A liquid crystal display cell comprising a pair of flexible polymer film substrates having a transparent electrode disposed on the surface thereof and a liquid crystal layer sandwiched therebetween, said transparent electrode being a metal oxide film which has an amorphous portion of not less than 70% in the entire metal oxide film, a surface resistivity of 10 to 80 ohm per square, a transmittance to light of 550 nm of not less than 80%, a bending property of not greater than 1.5, a curling degree, H, of $0<H<5$ mm and an etching time of not greater than 90 sec.

8. A liquid crystal display cell according to claim 7, wherein the transparent electrode is formed by a DC sputtering method.

9. A liquid crystal display cell according to claim 8, wherein the DC sputtering method is carried out under film-forming conditions of a mixing ratio (partial pressure ratio) between a reaction gas and a carrier gas of 5/1000–10/1000, a vacuum degree of $10^{-3}$–$10^{-4}$ Torr, a film-forming rate of 5–13 Å/sec, a sputtering voltage of 200–500 V and a substrate temperature of not higher than 120° C.

10. A liquid crystal display cell according to claim 7, wherein the thickness of the transparent electrode is from 500 to 2000 Å.

11. A liquid crystal display cell according to claim 7, wherein said metal oxide film is selected from the group consisting of ITO, indium oxide, tin oxide, zinc oxide or antimony oxide.

* * * * *